United States Patent
Pels

(10) Patent No.: US 6,274,942 B1
(45) Date of Patent: Aug. 14, 2001

(54) APPARATUS FOR RETARDING THE INCREASE IN BRAKING TORQUE ASSOCIATED WITH CONNECTING AN ELECTRICAL CONSUMER TO A POWER SUPPLY OF A DRIVE SYSTEM IN A VEHICLE

(75) Inventor: Thomas Pels, Achern (DE)

(73) Assignee: ISAD Electronic Systems GmbH & Co. KG, Cologne (DE)

(*) Notice: Subject to any disclaimer, the term of this patent is extended or adjusted under 35 U.S.C. 154(b) by 0 days.

(21) Appl. No.: 09/389,729

(22) Filed: Sep. 3, 1999

Related U.S. Application Data

(63) Continuation of application No. PCT/EP98/01301, filed on Mar. 6, 1998.

(30) Foreign Application Priority Data

Mar. 6, 1997 (DE) .............................. 197 09 135

(51) Int. Cl.[7] ................................... H02P 9/04
(52) U.S. Cl. ................ 290/40 B; 290/40 C; 322/7; 322/8
(58) Field of Search ................ 290/40 R, 40 B, 290/40 C; 322/14, 18, 19, 25; 323/267

(56) References Cited

U.S. PATENT DOCUMENTS

| | | | |
|---|---|---|---|
| Re. 36,454 | * 12/1999 | Ball et al. | 322/23 |
| 3,098,190 | * 7/1963 | Spencer et al. | 322/29 |
| 4,423,363 | * 12/1983 | Clark et al. | 318/375 |
| 4,720,666 | * 1/1988 | Yokota | 322/10 |
| 5,053,632 | * 10/1991 | Suzuki et al. | 290/45 |
| 5,119,014 | 6/1992 | Kronberg | 323/267 |
| 5,228,305 | 7/1993 | Vogt | 62/133 |
| 5,283,470 | * 2/1994 | Hadley et al. | 290/45 |
| 5,442,276 | * 8/1995 | Schwartz et al. | 322/25 |
| 5,467,008 | 11/1995 | Uchinami | 322/27 |
| 5,561,363 | 10/1996 | Mashino et al. | 322/25 |
| 5,635,768 | 6/1997 | Birch et al. | 290/40 |
| 5,710,465 | 1/1998 | Saito et al. | 307/10.1 |

FOREIGN PATENT DOCUMENTS

| | | |
|---|---|---|
| 224 294 | 4/1909 | (DE) . |
| 31 51 851 | 12/1983 | (DE) . |
| 43 25 505 A1 | 2/1994 | (DE) . |
| 195 14 738 A1 | 10/1995 | (DE) . |
| 0 106 539 A2 | 4/1984 | (EP) . |
| 0 407 633 A1 | 1/1991 | (EP) . |
| 0 680 139 A1 | 11/1995 | (EP) . |
| 61-191201 | 8/1986 | (JP) . |
| 694967 | 10/1979 | (RU) . |

OTHER PUBLICATIONS

*Kraftfahrtechnisches Taschenbuch/Bosch (Automotive Handbook/Bosch)*, p. 466, 21st Edition, 1991.(German/with English Abstract).
*International Search Report* concerning International Application Serial No. PCT/EP98/01301, European Patent Office, dated 25.08.98, 7 pages.
Standard Handbook for Electrical Engineers, Eleven Edition, Donald G. Fink editor–in chief, 1978.*

* cited by examiner

*Primary Examiner*—Nicholas Ponomarenko
(74) *Attorney, Agent, or Firm*—Marshall, O'Toole, Gerstein, Murray & Borun

(57) ABSTRACT

An apparatus for retarding an increase in braking torque associated with connecting an electrical consumer to a power supply of a drive system of a vehicle such as an internal combustion engine is disclosed. The apparatus includes a generator operatively connected to the drive engine. The generator serves to supply one or more electrical consumers. The apparatus also includes a control system which causes the generator to subject the drive engine to a slowly increasing braking torque during engagement of one or more electrical consumers to thereby provide time for performance of an ignition or filling intervention to ensure the increased load of the added consumer(s) does not cause undesirable effects in engine performance.

35 Claims, 5 Drawing Sheets

APPARATUS FOR RETARDING THE INCREASE IN BRAKING TORQUE ASSOCIATED WITH CONNECTING AN ELECTRICAL CONSUMER TO A POWER SUPPLY OF A DRIVE SYSTEM IN A VEHICLE

RELATED APPLICATION

This patent claims priority under 35 U.S.C. § 120 from International Patent Application Serial No. PCT/EP98/01301 filed Mar. 6, 1998.

FIELD OF THE INVENTION

The invention relates generally to drive systems, and, more particularly, to an apparatus for retarding the increase in braking torque associated with connecting an electrical consumer to a power supply of a drive system in a vehicle.

BACKGROUND OF THE INVENTION

In addition to actually propelling an associated vehicle, the drive engines of conventional vehicles also serve to drive additional units and to generate electric power by means of a generator connected to the drive engine. Electric power is required to supply a variety of consumers, some of which have relatively high power uptake requirements. Exemplary consumers of this type include heaters, (e.g., window, passenger compartment, seat, and catalyst heaters), air conditioning compressors, and high-powered drives (e.g., electrically operated steering systems and electrically operated brakes). When the drive engine is not being used to propel the vehicle, it runs in an idling state. In the idling state, the drive engine need only perform the work required to drive its own rotation, the work required to drive any mechanical auxiliary units, and the work required to drive the generator. To keep fuel consumption, pollutant emissions and noise development low, the idling speed is generally chosen as low as possible and, in fact, is set just above a minimum speed. In order to ensure the engine does not run haltingly or even stop, this minimum speed should not be fallen short of, even for a brief time. In the idling state, the internal combustion engine has only a very limited power reserve.

In conventional systems, switching on an electrical consumer of high power leads to a sudden voltage drop in the electrical system (or another system via which the consumer is supplied). This voltage drop leads to a sudden rise in exciter current in the generator control to constant voltage, which is accompanied by a likewise sudden increase in the braking torque exerted by the generator on the internal combustion engine. Such an increase in braking torque causes a drop in the idling speed of the internal combustion engine.

Conventional idling speed control systems seek to counteract such drops by performing a so-called filling intervention and/or an ignition intervention (see, for example, Automotive Handbook/Bosch, 21st edition, 1991, p. 466). In a typical filling intervention, a drop in the idling speed is counteracted by injecting an increased amount of fuel into the engine. The internal combustion engine responds to the fuel increase by producing an increased drive torque. Unfortunately, a relatively long period of time typically elapses before the increased torque produced by the filling intervention is made available. Control is, therefore, sluggish in the filling intervention context.

In a conventional ignition intervention, a drop in the idling speed of the internal combustion engine is counteracted by adjusting the ignition point from "late" to "early" in the ignition cycle. Shifting the ignition point in this manner causes an increase in the drive torque produced by the engine. Ignition intervention is much faster than filling intervention (i.e., it has a much shorter response time). However, ignition intervention is disadvantageous in that the internal combustion engines employing ignition intervention must be generally operated with a late ignition point in the idling state in order to ensure there is sufficient latitude for ignition point adjustment to occur in the "early" direction during a drop in the idling speed.

Although both intervention solutions mentioned above function in principle, they are not considered optimal. In particular, because of the relatively sluggish response of filling intervention, to avoid a temporary drop below the minimum idling speed, the idling speed of internal combustion engines employing that technique must generally be placed a relatively large distance above the minimum speed. On the other hand, in engines employing ignition intervention, the internal combustion engine runs with reduced efficiency because, as mentioned above, the ignition point must be set late in the ignition cycle. Both of the conventional intervention solutions, therefore, cause increased fuel consumption and pollutant emissions in comparison with constant idle conditions.

SUMMARY OF THE INVENTION

In accordance with an aspect of the invention, an apparatus is provided for use with a vehicle having a drive engine and at least two consumers of electrical power. The apparatus operates to retard an increase in braking torque associated with connecting the at least two consumers to a source of electrical power. The apparatus includes at least one generator operatively connected to the drive engine for developing a supply current. The at least one generator applies a braking torque to the drive engine. The braking torque is dependent upon the supply current. The apparatus also includes a control system operatively coupled to the at least two consumers. The control system is responsive to a control signal requesting activation of the at least two consumers to connect the at least two consumers to the supply current developed by the at least one generator in succession to thereby ensure the braking torque applied to the drive engine by the at least one generator increases over a predefined time period rather than instantaneously when the at least two consumers are activated.

In accordance with another aspect of the invention, an apparatus is provided for use with a vehicle having a drive engine, a first consumer of electrical power, and an energy storage device. The apparatus retards an increase in braking torque associated with connecting the consumer to a source of electrical power. The apparatus includes at least one generator operatively connected to the drive engine for developing a supply current. The at least one generator applies a braking torque to the drive engine. The braking torque is dependent upon the supply current. The apparatus also includes a control system which is responsive to a control signal received at a first time and requesting activation of the consumer to connect the consumer to the supply current developed by the at least one generator after a delay period to thereby enable the at least one generator to increase both the supply current and the braking torque applied to the drive engine over the delay period rather than abruptly. The control system is adapted to supply at least a portion of the increased current supply developed in the delay period to the energy storage device.

In accordance with still another aspect of the invention, a method is provided for retarding an increase in braking torque associated with connecting at least two consumers to a source of electrical power. The method comprises the steps of: developing a supply current with at least one generator operatively coupled to the drive engine; and receiving a control signal requesting activation of the at least two consumers. It also comprises the step of ensuring that a braking torque applied to the drive engine by the at least one generator increases over a predefined time period rather than instantaneously when the at least two consumers are activated by: (a) connecting a first one of the at least two consumers to the supply current developed by the at least one generator at a first time; and (b) connecting a second one of the at least two consumers to the supply current developed by the at least one generator at a second time after the first time.

In accordance with yet another aspect of the invention, a method is provided for retarding an increase in braking torque associated with connecting a consumer to a source of electrical power. The method comprises the steps of: developing a supply current with at least one generator operatively coupled to the drive engine; receiving a control signal at a first time requesting activation of the consumer; and controlling the at least one generator to increase both the supply current and the braking torque applied to the drive engine over a delay period rather than abruptly. It also includes the steps of: supplying at least a portion of the increased current supply developed in the delay period to the energy storage device; and connecting the consumer to the supply current developed by the at least one generator after the delay period.

Other features and advantages are inherent in the disclosed apparatus or will become apparent to those skilled in the art from the following detailed description and its accompanying drawings.

DESCRIPTION OF THE PREFERRED EMBODIMENTS

Figure 1A:
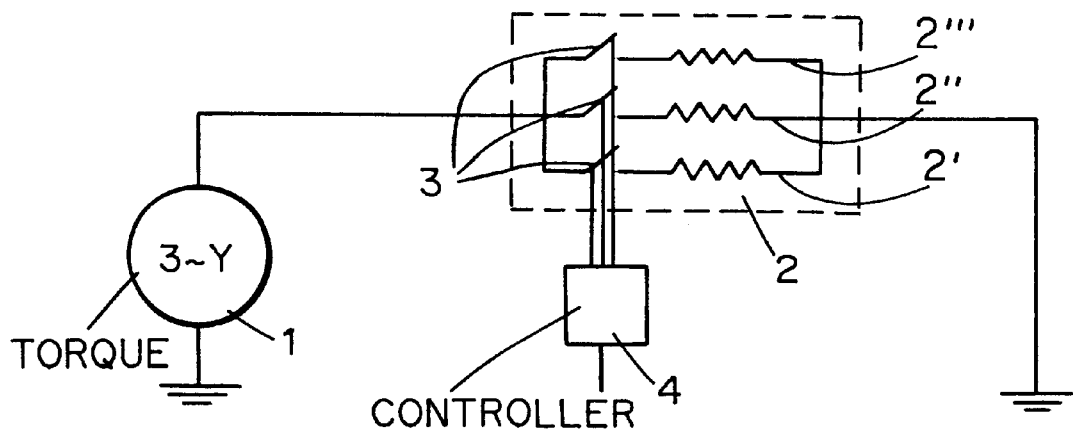
FIG. 1a is a circuit diagram schematically illustrating an apparatus constructed in accordance with the teachings of the instant invention.

In the following description, functionally equivalent or similar parts in the figures are designated with similar reference numbers.

In the examples shown in FIGS. 1–6, apparatus constructed in accordance with the teachings of the invention are used to retard an increase in braking torque associated with connecting one or more consumers of electrical power (e.g., a heater or air conditioner compressor) to a generator driven by an internal combustion engine. Each of the disclosed apparatus achieves this retardation by controlling the rate at which the current drawn from the generator is increased to supply the new load and, thus, by controlling the rate at which the generator increases the braking torque it applies to the engine. In other words, each apparatus is provided with a control system which causes the generator to only expose the associated internal combustion engine to a slowly rising braking torque when one or more electrical consumers are turned on.

The rise in braking torque is preferably slowed so that a relatively sluggish filling intervention control can correspondingly increase the drive torque of the internal combustion engine so that the idling speed of the internal combustion engine is only insubstantially reduced (if at all) by switching on the consumer(s). It should be noted that as used herein "switching on" refers to the command to turn on or switch on the consumer(s). This command can be produced, manually, for example, by activating a switch, or automatically by a control device (e.g., a thermostat). The actual beginning of operation of the consumer, on the other hand, can be delayed relative to the switching on event and is, therefore, referred to as "engagement" to distinguish it from the switching on event. It should also be mentioned that "switching on" and "engagement" do not denote merely an "off-on switching process", but also include any power increase, (e.g., the transition from a lower to higher heating stage in an electrical heater). "Retarded rise" is understood to mean a rise in braking torque that is less steep as a function of time than the rise that would occur during immediate engagement of the consumer(s) (for example, by simple closure of a switch contact to immediately connect the consumer(s) to the current supplied by the generator where the consumer(s) receive all of their power from the generator). The rise is preferably retarded so that the braking torque virtually reaches its new final value (i.e., at least 97% of its final value) after 0.5–5 seconds.

Whereas prior art proposals to improve idle control seek to reduce the response time to a sudden change in disturbance quantity (here braking torque increase) in order to keep the deviation from the idling speed reference value as small as possible, the disclosed apparatus take a different approach to the problem. In particular, rather than making the idle control system more rapid (i.e., reducing its response time), the disclosed apparatus retards or slows the change in the disturbance quantity. Slowing disturbance quantity changes permits the use of relatively sluggish intervention control systems to keep the deviations from the reference idle speed limited. Consequently, relatively slow idle control systems, like filling intervention (for example, without ignition intervention) can be used without requiring a further increase in the set idling speed above the minimum speed. On the contrary, the reference value of the idling speed can be set just above the minimum speed.

Retarding or slowing the introduction of the full braking torque through the generator is not only advantageous during the idling state of a vehicle, but also during the drive states of the vehicle. During drive states, sudden engagement of high-power consumers can be noticeable as an interfering torque excursion. This is especially true in the lower partial load range of a vehicle. Such sudden torque reductions can be avoided by employing a drive system which utilizes the braking torque retardation techniques disclosed herein.

In the depicted practical examples, an electric machine is connected to an internal combustion engine. The electric machine is designated as a generator 1 in the following description and drawings, since it is the generator function of the machine that is of primary interest here. Persons of ordinary skill in the art will readily appreciate, however, that the electric machine 1 can also function as a motor when supplied with current without departing from the scope or spirit of the invention. In its capacity as a generator, the electric machine 1 serves to supply electric power to one or more electrical consumers 2.

Figure 1B:
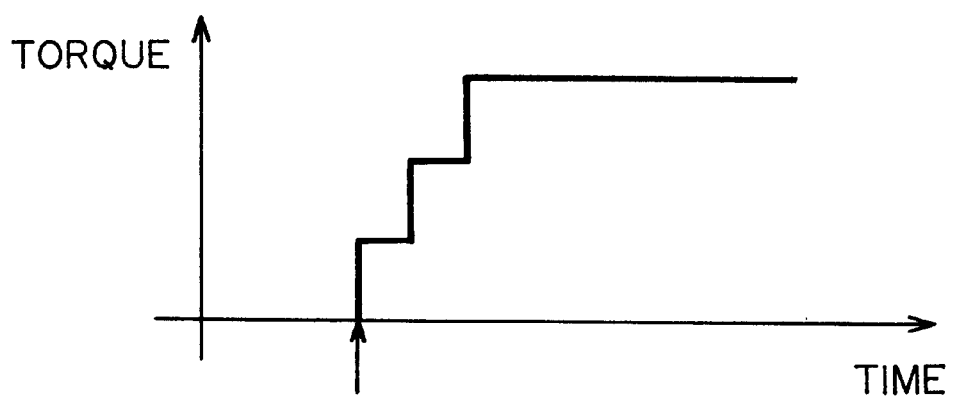
FIG. 1b is a graph illustrating the braking torque generated by the circuit of FIG. 1a as a function of time.

The practical example shown in FIG. 1 involves an electrical consumer 2 constructed from several parallel-connected subconsumers 2', 2", 2'''. The subconsumers 2', 2", 2''' can be engaged and disengaged individually by means of controlled switches 3 (which are implemented, for example, by electronic or electromechanical switches). A controller 4 is connected to the consumer 2 and serves to control the switches 3. The controller 4 is responsive to a switch-on command received from a higher level control device (not shown here) to sequentially engage the subconsumers 2', 2", 2''' (i.e., the engagement times of the subconsumers 2', 2", 2''' are staggered in time). As a result, the power delivered by the generator 1 and, thus, its braking torque increases in an approximately step-like fashion as a function of time as shown in FIG. 1*b*. (The time at which the switch-on command is received by the controller 4 is shown by the arrow in FIG. 1*b*.) The first subconsumer 2' is engaged at the switch-on time in the example shown in FIG. 1*b*. The other two subconsumers 2" 2''' are engaged at later times (e.g., at the termination of the two intermediary plateaus in FIG. 1*b*).

Although the illustrated circuit uses only one controller 4, persons of ordinary skill in the art will readily appreciate that each individual switch 3 could optionally be connected to its own controller 4 without departing from the scope or spirit of the invention. In such an approach (not shown), the higher level control device assumes control of the time sequence of the individual switch-on points (i.e., addresses each controller 4 individually at its desired engagement time) in order to produce the step-like braking torque increase shown in FIG. 1*b*.

Although for ease of discussion the consumer 2 and subconsumers 2', 2", 2''' are shown as passive resistive elements, persons of ordinary skill in the art will readily appreciate that any or all of the consumer 2 and/or the subconsumers 2', 2", 2''' can include reactive elements (i.e., inductance or capacitance) and/or active elements (i.e., transistor, amplifier, etc.) without departing from the scope or spirit of the invention.

Figure 2A:
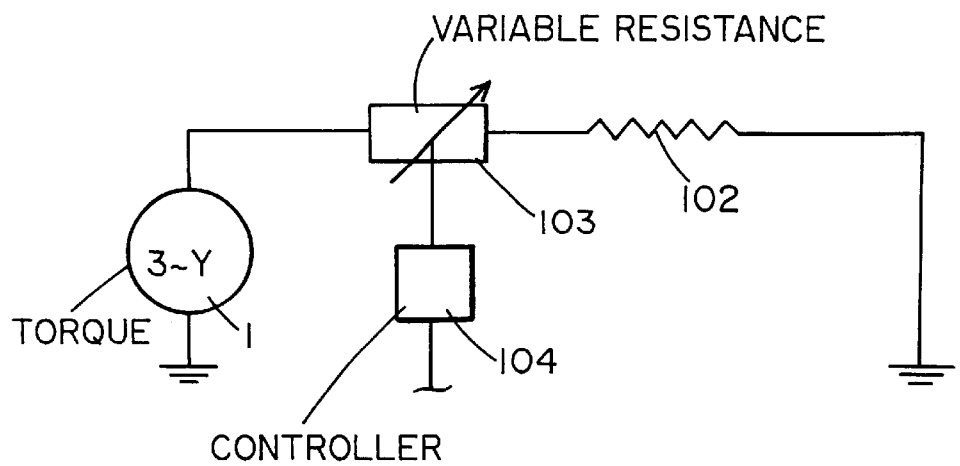
FIG. 2a is a circuit diagram schematically illustrating an apparatus employing a variable resistance to control current supplied to a consumer from a generator.
Figure 2B:
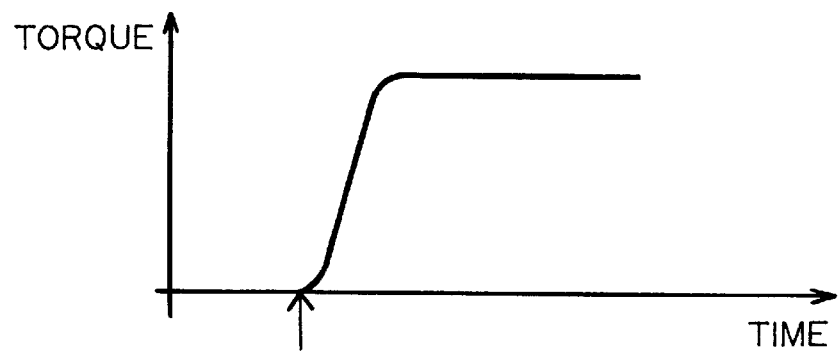
FIG. 2b is a graph illustrating the braking torque generated by the circuit of FIG. 2a as a function of time.

In the circuit shown in FIG. 2*a*, a variable resistance 103 is connected in series with a consumer 102. The variable resistance 103 can be implemented electronically (for example, by means of power semiconductors), or electromechanically. Adjustment of the resistance can occur continuously, quasicontinuously (i.e., in small steps) or in steps (i.e., in larger steps). The latter approach could be implemented, for example, by bridging several discrete series-connected subresistances (not shown) in succession. The former approach can be implemented by using a power semiconductor as the variable resistance. In either event, a controller 104 preferably controls the value of the variable resistance 103 as a function of time. FIG. 2*b* shows an exemplary time trend of the braking torque produced by the generator 1 of FIG. 2*a* in the case of continuous adjustments to the resistance of the variable resistance 103. In particular, when the controller 104 receives a command to turn on (i.e., supply power to) the consumer 102 at the switch-on time (marked by the arrow in FIG. 2*b*), it continuously adjusts the variable resistance 103 over a predefined time period such that the braking torque rises until a maximum value is reached. Continuous adjustment of the resistance 103 permits a continuous rise of the braking torque.

Figure 3A:
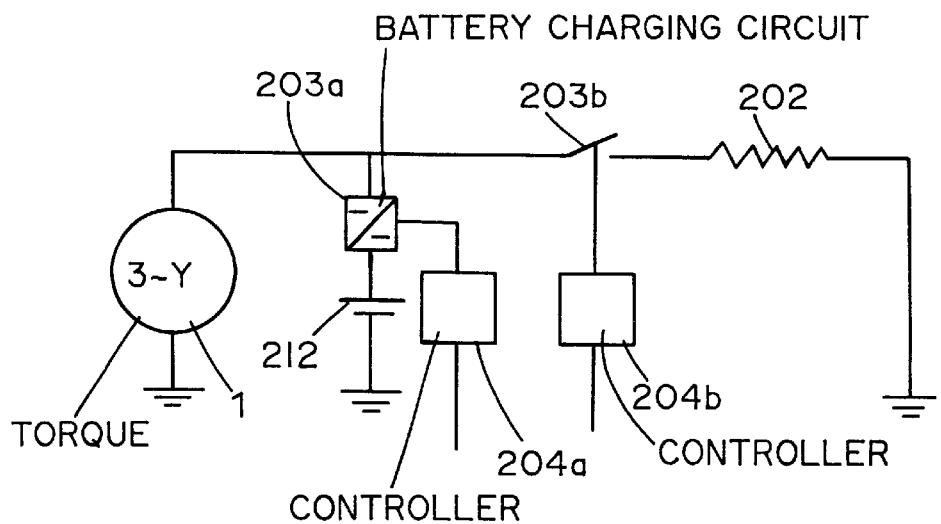
FIG. 3a is a circuit diagram schematically illustrating an apparatus constructed in accordance with the teachings of the instant invention.

Another apparatus constructed in accordance with the teachings of the invention for achieving a retarded rise in braking torque is shown in FIG. 3*a*. In the apparatus of FIG. 3*a*, engagement of the consumer 202 occurs abruptly. However, the engagement is delayed relative to the time of the switch-on command (shown by the arrow in FIG. 3*b*). During the time interval between the switch on command and the abrupt engagement of the consumer 202, the power uptake of another consumer 212 is gradually increased by a value corresponding to the (expected) power uptake of the consumer 202. The increased power uptake of the other consumer 212 is abruptly reduced to the original value (which can optionally be zero), synchronously (and preferably substantially simultaneously) with the abrupt engagement of the consumer 202.

In the apparatus shown in FIG. 3*a*, the other consumer 212 is implemented by an accumulator 12 (for example, a battery or capacitor) which is connected in parallel with the consumer 202 and which can store the electrical energy occurring in the time interval for later use. A battery charging circuit 203*a* is connected in front of the accumulator 212 and functions to control (e.g., vary) the battery charging current. A switch 203*b* is connected in front of the consumer 202 and operates to abruptly engage and disengage the consumer 202. The battery charging circuit 203*a* and the switch 203*b* are respectively connected to controllers 204*a*, 204*b*. The controllers 204*a*, 204*b* are controlled to operate synchronously by a higher level control device (FIG. 5) to thereby control the interaction between the accumulator 212 and the electrical consumer 202.

Figure 3B:
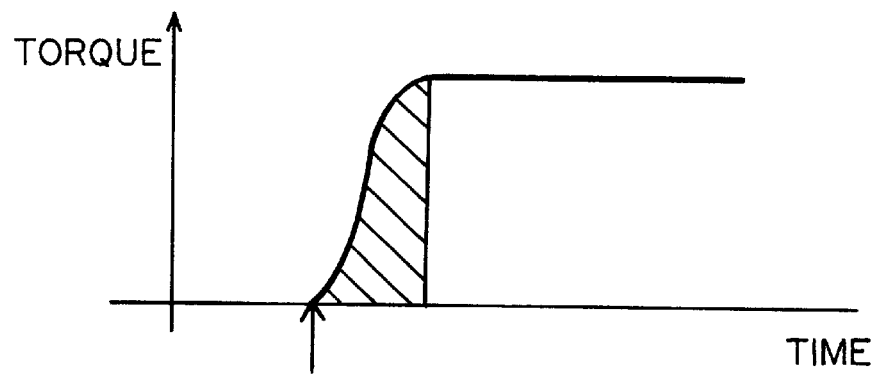
FIG. 3b is a graph illustrating the braking torque generated by the circuit of FIG. 3a as a function of time.

The apparatus of FIG. 3*a* generates the gradual rise of torque shown in FIG. 3*b*. In particular, when a switch-on command (marked by the arrow) is received with the switch 203*b* opened, the battery charging current is initially gradually raised by corresponding control of the charging current control circuit 203*a* until the increased charging power drawn by the charging circuit 203*a* substantially corresponds to the anticipated consumer power expected to be drawn by the consumer 202. The higher level control device then causes the charging circuit 203*a* to abruptly reduce the charging current to the original value (for example, value zero) and at the same time causes the switch 203*b* to close so that the consumer 202 abruptly receives its full power from the generator 1. The energy delivered to the battery 212 is shown in FIG. 3*b* by the shaded area (a constant speed is presumed here so that the time shown in FIG. 3*b* is proportional to the torque angle). The depicted uniform retarded increase of the braking torque is obtained by this operation.

Figure 4A:
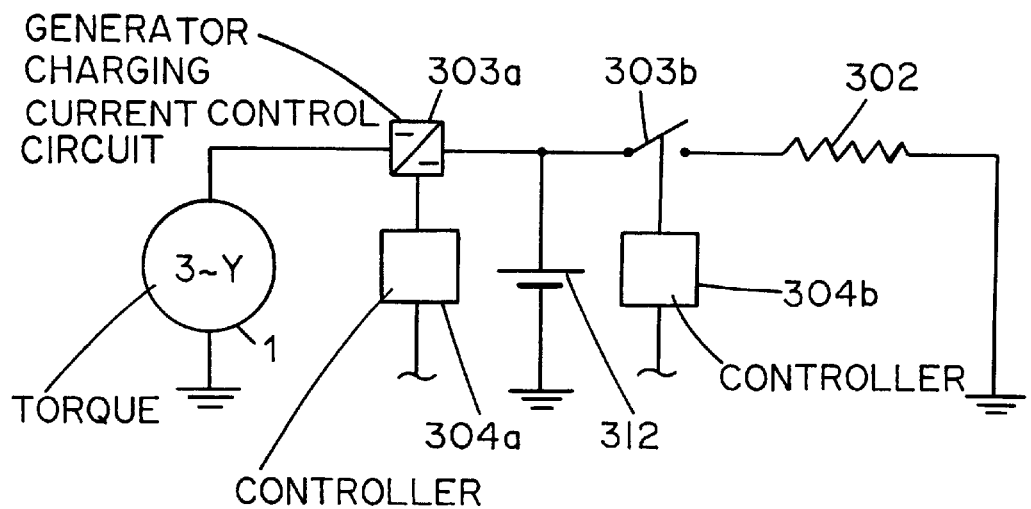
FIG. 4a is a circuit diagram schematically illustrating an apparatus constructed in accordance with the teachings of the instant invention.
Figure 4B:
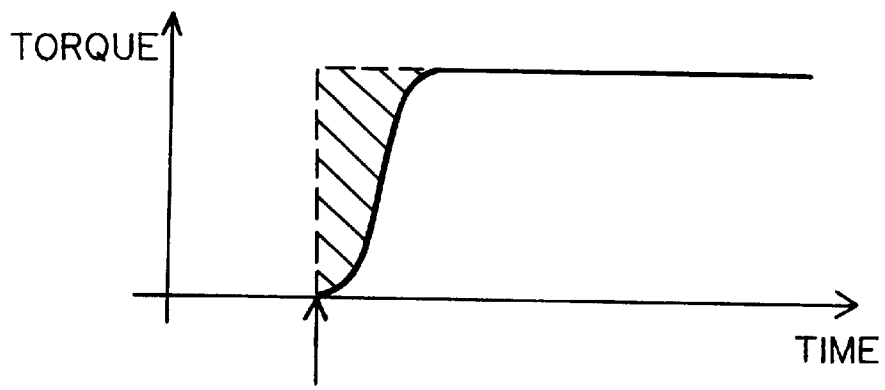
FIG. 4b is a graph illustrating the braking torque generated by the circuit of FIG. 4a as a function of time.

FIG. 4*a* shows another apparatus constructed in accordance with the teachings of the invention. In the apparatus of FIG. 4*a*, upon receipt of a switch on command, the full electric power required by the consumer 302 is immediately available to the consumer 302. A generator charging current control circuit 303a is connected jointly to the accumulator 312 and the consumer 302. The consumer 302 can be connected to the accumulator 312 by means of a switch 303b. As with the apparatus of FIG. 3a, control is performed by local controllers 304a, 304b and by a higher level control device (not shown). When the switch-on command is received (marked by an arrow in FIG. 4b), the switch 303b is immediately closed and the consumer 302 is immediately exposed to full electric power. However, the charging circuit 303a initially transfers only limited power, which gradually rises to the total power required by the consumer 302. The missing portion of the energy (which is proportional to the shaded area in FIG. 4b) is drawn by the consumer 302 from the accumulator 312. As a result, the retarded rise in braking torque shown in FIG. 4b is attained. The braking torque shown with a dashed line in FIG. 4b is the torque which would occur if the consumer 302 received full power from the generator immediately upon receipt of the switch-on command.

Figure 5:
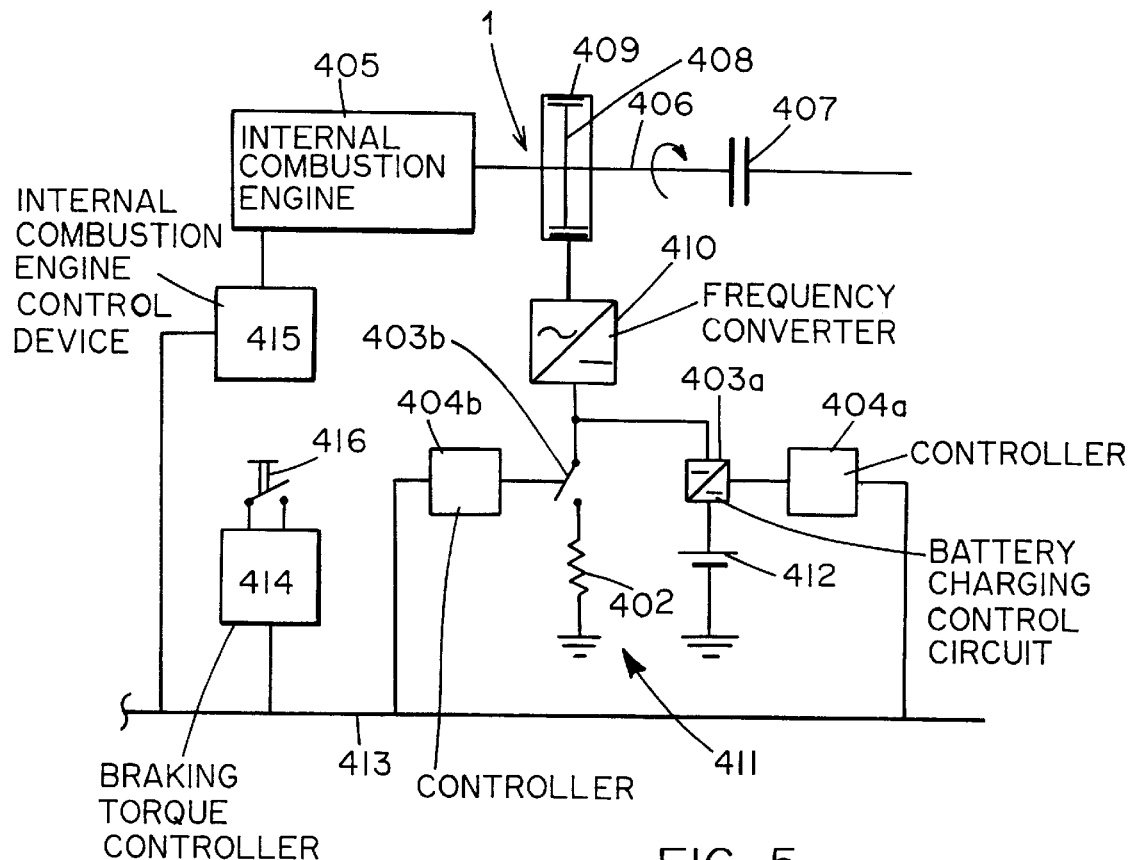
FIG. 5 is a more detailed circuit diagram schematically illustrating an apparatus constructed in accordance with the teachings of the instant invention.

A more detailed illustration of the apparatus of FIG. 3a is shown in FIG. 5. The drive system of a vehicle (for example, a passenger car) has an internal combustion engine 405, which releases torque to the drive wheels of the vehicle via a drive shaft 406 (for example, the crankshaft of the internal combustion engine 405, a clutch 407 and additional (not shown) parts of a drive train). The clutch 407 is open during idling. An electric machine referred to herein as a generator 1 sits on the drive shaft 406. In the illustrated example, the generator 1 is implemented by an asynchronous three-phase machine. It has a rotor 408 sitting directly on the drive shaft 406 and connected to rotate in unison therewith. It also has a stator 409, which is supported, for example, on the housing of the internal combustion engine 405. A frequency converter 410 supplies the stator winding (not shown) with electrical current and voltage of almost freely adjustable amplitude, phase and frequency, in order to generate a rotating field that lags behind the rotor 408 with slip and, thus, brakes the rotor 408 to produce a generator effect. A dc-intermediate circuit-inverter is included in the converter 410. The inverter generates sinusoidal width-modulated pulses by means of electronic switches (for example, field effect transistors or IGBTs) which, when averaged by the inductance of the generator 1, lead to almost sinusoidal currents of the desired frequency, amplitude and phase in generator 1. During the braking function, the three-phase machine 1 operates so that the current and voltage are directed opposite each other. The frequency converter 410 then effectively acts as a rectifier. In other variants employing a synchronous three-phase generator (not shown), a simple rectifier is used instead of the frequency converter 410. The rectifier is equipped with valves (for example, diodes) controlled by the applied voltage. As will be readily appreciated by persons of ordinary skill in the art, the electric machine 1 can also exert a motor function in addition to the generator function. For example, the electric machine 1 can also serve as a starter for the internal combustion engine 405. When the electric machine is operated as a motor, the frequency converter 410 is controlled so that current and voltage are in the same direction.

The frequency converter 410 supplies a dc electrical system 411. The dc system 411 includes a system battery 412 and electrical consumers. In the example of FIG. 5, only one electrical consumer 402 is shown. As with the apparatus of FIG. 3a, the apparatus of FIG. 5 includes a battery charging control circuit 403a which is connected in series with a battery 412. It also includes a switch 403b which is connected in series with the consumer 402. Also as in the apparatus of FIG. 3a, the switch 403b is controlled by a controller 404b and the battery charging control circuit 403a is controlled by a controller 404a. Each of the controllers 404a, 404b is connected to a control bus 413.

A braking torque control device 414 sends control signals to the controllers 404a and 404b via the control bus 413. The control signals sent via the control bus 413 consist of an address part to activate a desired controller 404a, 404b, and a command part to cause the addressed controller 404a, 404b and the associated element 403a, 404a controlled by the addressed controller 404a, 404b to perform a certain action (for example, "close switch"). The braking torque controller 414 is also connected to a number of other devices via the control bus 413. For example, the braking torque control device 414 can communicate with an internal combustion engine control device 415, a speedometer (not shown), a throttle valve adjustment sensor (not shown), etc. via the bus 413.

The braking torque control device 414 is directly coupled (or via control bus 413) to an activation switch 416. An operating person can actuate the activation switch 416 to manually give the command to switch on or switch off the consumer 402. Of course, switch-on and switch-off commands for the consumer 402 can also (or alternatively) be generated automatically by the drive system itself. For example, if the consumer 402 supplies additional heat for the cooling water of the internal combustion engine 405 when a certain minimum temperature is fallen short of, the consumer 405 can be automatically switched on, and, when the minimum temperature is surpassed, automatically switched off. This can be advantageous, for example, in direct injection turbodiesel engines, since such engines often do not produce sufficient heat during winter operation for heating of the cooling water to the operating temperature and, therefore, require additional heating. Coupling the braking torque control device 414 and the internal combustion engine controller 415 serves, among other things, to provide information concerning the expected additional torque requirement generated by the switching on of a consumer 402 to the internal combustion engine controller 415 at the time a switch-on command is received. The engine controller 415 can use this information to produce a torque-increased filling intervention before a noticeable reduction of idling speed occurs.

Figure 6:
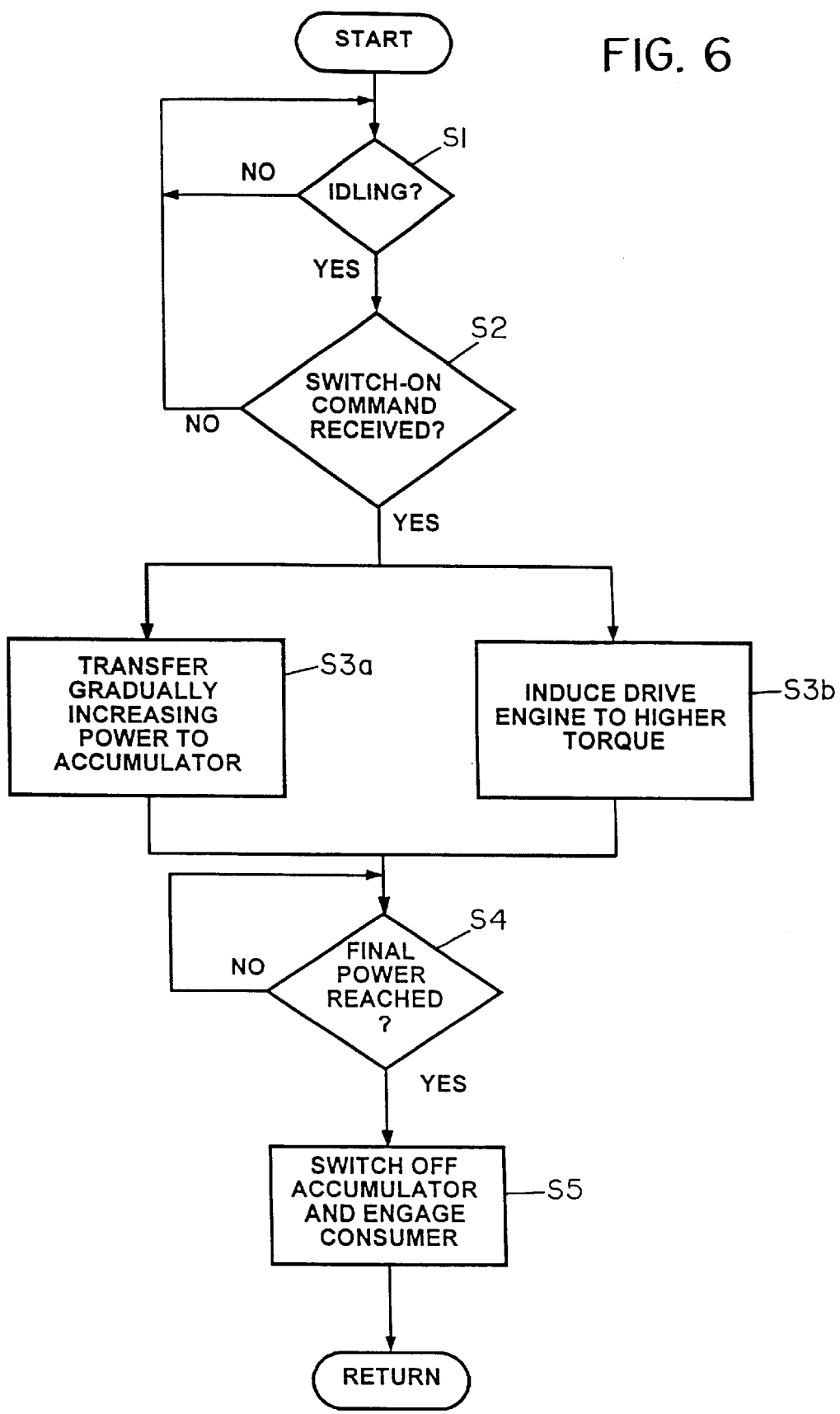
FIG. 6 is a flow chart illustrating a method of operating the apparatus of FIG. 5.

The method of operation of the drive system of FIG. 5 is explained below with reference to the flow chart of FIG. 6. In step S1, the braking torque controller 414 determines whether the drive system is operating in idle. In the next step S2, the braking torque controller 414 determines whether a command to connect the consumer 402 to the generator has been received, (for example, by activation of the switch 416). In the illustrated example, the process only continues to step S3a when the engine is idling and a switch-on command has been received. Otherwise, steps S1 and S2 are repeated. At step S3a, the braking torque control device 414 controls the battery charging control circuit 403a via the controller 404a such that a gradually rising electric power is transferred to the accumulator 412 from the generator 1. The braking torque of the generator 1 gradually rises accordingly. (At this point the switch 403b is still open.) Simultaneously with step S3a, the braking torque control device 414 informs the internal combustion engine control device 415 of the aforementioned increase in required power (step S3b). The engine controller 415 responds by increasing the desired torque of the internal combustion engine 405 (for example, it initiates a filling intervention) to the level needed to maintain the idling speed when the increased load of the consumer 402 is engaged. (Step S3b).

At step S4, the battery charging power is compared to the expected power of the consumer 1. If the battery charging power has reached the expected power level, the braking torque control device 414 causes an abrupt termination of the charging process (i.e., stops the increased flow of current to the battery 412) by controlling the charging control circuit 403a via the controller 404a, and simultaneously closes the switch 403b (by command to the controller 404b) to thereby connect the consumer 402 to the generator 1. (Step S3). Owing to the delayed rise in braking torque, the idling speed exhibits virtually no reduction when the consumer 402 is engaged (i.e., the switch 403b is closed) because the filling intervention has had time to take effect. The basic idea is, therefore, that the driver of the vehicle does not switch on large electrical consumers directly himself, but instead, gives a switch-on command which initiates a program for delayed engagement of the full consumer power load, or, in the variant according to FIG. 4, for delayed loading of the generator 1, despite immediate full consumer local engagement.

Figure 7:
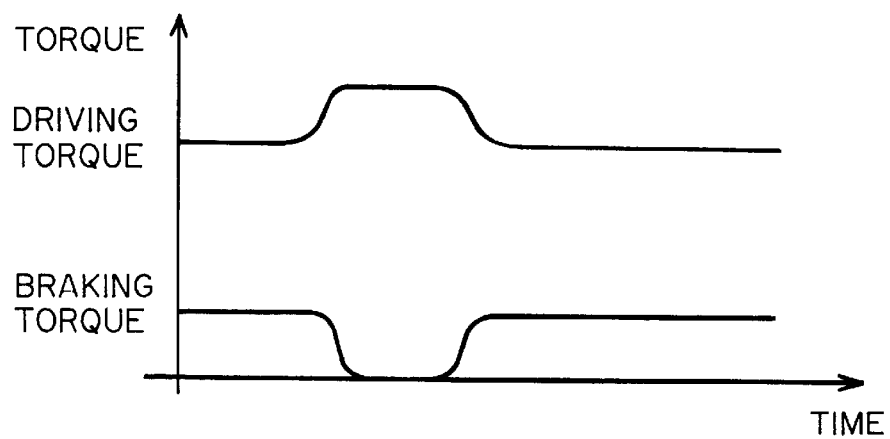
FIG. 7 is a graph illustrating an exemplary response of the drive torque of an internal combustion engine and the braking torque of a generator associated with the engine as a function of time in the context of a demand for increased power by the drive engine during propulsion of a vehicle.

The control system shown in FIG. 5 is also suitable for use according to a second aspect of the invention, which is illustrated in FIG. 7. In this embodiment, the internal combustion engine control device 415 notifies the braking torque control device 414 when a high torque requirement is encountered by the internal combustion engine 405. Such a requirement can occur, for example, during a desired high vehicle acceleration, perhaps during a passing maneuver. Upon receipt of such notification, the braking torque control device 414 causes the controller 404b to switch off the consumer 402 and, optionally, cause the controller 404a to interrupt any battery charging current drawn by the charging circuit 403b. As shown in FIG. 7, this interruption causes a reduction in the braking torque produced by the generator 1 to thereby free up driving torque to meet the acceleration requirement. When the torque requirement on the internal combustion engine 405 diminishes again, the consumer 402, and possibly the battery charging process, can be re-engaged. Safety- or operation-relevant consumers that are to be operated free of interruption can be supplied from an energy accumulator, (for example, the vehicle battery 412) in instances of high required internal combustion engine torque. In instances where a number of such consumers are present, in order to rule out unduly excessive discharge of the vehicle battery 412, the consumers 402 can be partially or fully switched off as a function of the charging state of the energy accumulator 412 in a sequence according to stipulated consumer priorities. FIG. 7 shows an exemplary temporary reduction of generator braking torque during an increase in internal combustion engine torque as a function of time, as well as the subsequent return to the initial state during the subsequent reduction of the internal combustion engine braking torque demand.

From the foregoing, persons of ordinary skill in the art will readily appreciate that the disclosed apparatus permits the serviced engines to operate at a lower idling speed than engines serviced by ordinary drive systems and, therefore, makes possible lower fuel consumption, lower exhaust emission and lower noise load. Thus, they contribute to environmental protection and reasonable use of scarce resources.

As discussed above, the retarded rise in braking torque can be accomplished in different ways. In a particularly simple and advantageous embodiment shown in FIG. 1a, the control system causes consumers 2', 2", 2'" to be engaged in succession (at least several of them) when several consumers 2', 2", 2'" are to be switched on simultaneously. A step-like increase in (total) braking torque is obtained by this approach (see FIG. 1b).

In another advantageous embodiment, an electrical consumer 2, 102 is engaged with a slowly rising power uptake. This can occur, for example, in a consumer 2 constructed from several parallel-connected partial consumers by time-delayed switching on of the partial consumers (see FIG. 1a). For example, individual parallel-connected heating wires in a window heater which are individually switchable can be switched on in succession. This corresponds in principle to the above delayed engagement of several different consumers. Another possibility to achieve a slowly rising power uptake comprises connecting a variable preliminary resistance 103 to the consumers 102 and controlling the resistance 103 so that its value diminishes slowly after the switching on command (see FIG. 2a). Another possibility comprises exposing the electrical consumers to a variable voltage whose value increases slowly after the switching on event. This increasing voltage can be achieved, for example, with a so-called chopper, (e.g., by pulse frequency or pulse width modulation using power semiconductor switches). For example, during pulse width modulation, pulses of stipulated frequency are initially short immediately after switching on the consumer and then become increasingly longer. With sufficiently high pulse frequency, the intrinsic inductance of the consumer (or an additional inductance) can average the pulses and, thus, cause a uniformly rising voltage trend. This type of chopper can be locally connected to each large electrical consumer.

Another advantageous approach to achieving a slowing rising braking torque comprises abruptly engaging the consumer 202 to the power supply (i.e., the generator 1), but doing so after a delay relative to the switching-on command (see FIGS. 3a and 3b). In the time interval between receipt of the switching-on command and the actual engagement of the consumer 202, the electrical machine 1 is controlled so that it generates a slowly rising braking torque whose final value substantially corresponds to the braking torque value expected at engagement. The electric power generating in the delay time interval is fed, for example, to an energy accumulator or other consumer 212. Supply of the other consumer (212) is abruptly ended (or reduced) synchronously with engagement of the consumer 202. The energy accumulator 212 can be implemented by a long term storage device (e.g., an ordinary starter battery) or a short-term accumulator (e.g., a capacitor battery, or a flywheel accumulator). The other consumers in this example can be a heating resistance provided for this purpose. Alternatively, an existing consumer can also be co-employed for this purpose (for example, a rear window heater).

As will be appreciated by persons of ordinary skill in the art, an immediate response at the switching-on point is generally desired in safety-relevant consumers, like lights and electrical brakes. Slowly rising braking torque can be advantageous achieved in such consumers by immediately engaging the electrical consumer 302 (e.g., without a time delay) with full power upon receipt of the switching-on command, but initially supplying the power (fully or partially) from an accumulator 312. The percentage of power supplied by the generator 1 is thereafter gradually increased by the control system. The accumulator 312 can be implemented by a starter battery or by a short-term accumulator or a flywheel accumulator.

As will be appreciated by persons of ordinary skill in the art, in all of the aforementioned embodiments, the rate of change of the braking torque for a specific consumer can be predefined. The same time trend of power uptake is then obtained each time a particular consumer is switched on. In other advantageous embodiments, the rate of rise in the braking torque is instantaneously controllable, (for example, by the control system) and can, therefore, be chosen individually during each switching-on process depending on, for example, the current power demands of other consumers, the instantaneous electric power produced by the generator 1, the speed of the internal combustion engine 405, the temperature of the internal combustion engine 405, etc.

In an advantageous embodiment, the internal combustion engine 405 is equipped with an autonomous idling speed control system, which is not (or at least not directly) connected to the control system for controlling the retarded rise in braking torque. Indirect coupling is preferably provided in that the idling speed control system detects a (slight) speed reduction caused by the increasing braking torque and countercontrols this speed reduction by a torque-increasing measure (for example, a filling intervention) so that the speed reduction is reduced or eliminated after some time (for example, with a controller with a P (proportional) or PI (proportional plus integral) characteristic).

Such an autonomous idle speed control system, however, can only react when a detectable speed drop has already been found. Therefore, in another advantageous embodiment the control system for controlling the retarded rise in the braking torque actively causes the internal combustion engine 405 to apply a correspondingly higher drive torque, for example, by a filling intervention. Under this approach, the filling intervention will generally occur before any torque reduction becomes apparent. Such control can be superimposed on the ordinary idling speed control; control with precontrol is then involved or, more precisely, disturbance-driven control, in which the disturbance is the instantaneous or briefly expected power uptake of an engaged consumer or one being engaged.

In any of the drive systems discussed above, a switch-on command is given at a certain time for a specific consumer. Such a command can be manually generated, for example, by the driver by operating a corresponding operating part (for example, a button, lever, pedal, etc.), or automatically generated by a control device, (for example, by a thermostat for heating). The control system receives the switch-on command and sends engagement information to the selected consumer. The engagement information controls the time of engagement and/or the time trend of power uptake of the consumer.

In principle, the engagement information can be present in the form of a voltage peak of the supply voltage, as is usually the case in vehicles. For example, a supply voltage level of 0 V means that the consumer takes up no power and a rise in supply voltage to 12 V leads to a corresponding rise in power uptake of the consumer. However, such a supply voltage control requires a star-like supply system (i.e., each individually engageable consumer requires its own feed cable), which leads to relatively heavy and thick cable harnesses.

A common feed of several or all individually engageable consumers is, therefore, advantageous. The feed voltage or at least its dc part then carries no information as to which consumer is to be engaged at which time. Instead, this control information can be sent to the consumers via separate control lines. While persons or ordinary skill in the art will appreciate that it is possible to connect each individual engageable consumer to its own control line in the fashion of a star net, in the preferred embodiments, control of the engagement behavior of the individual consumers is advantageously performed via a bus system 413, to which several or all consumers are connected. Preferably, this bus system 413 is a data bus system which is separated from the feed system, (for example, a so-called CAN bus system (CAN= controller area network)). Under this approach, the individual engageable consumers are equipped with their own controller (i.e., a control device such as a microcontroller or microprocessor) to which a specific address is allocated. The individual consumers can then be activated in succession via the common bus system by combined address/command words. In one modification, the feed system simultaneously serves as a control bus system. Under this modification the high-frequency control information (for example, the address/command words) are modulated onto the constant or low-frequency feed voltage.

As mentioned above, the control system can be adapted to switch off one or more electrical consumers (or reduces their power uptake) during a particularly high power demand for driving the vehicle. The increased power demand can involve, for example, acceleration phases of the vehicle. Since the percentage of power required by the electrical consumers in modern vehicles can constitute a significant percentage of the total power demand on the internal combustion engine, this ability to switch off (or reduce the amount of current supplied to) consumers when necessary to meet a drive torque demand advantageously permits smaller power dimensioning of the drive engine with equivalent vehicle acceleration values overall. Apart from the fact that such a drive engine can generally be more cost-effectively produced and has lower weight, it is operated, on the average over all operating states, at higher power (referred to as a maximum power) and, therefore, in a more favorable efficiency range. As a result, the drive engine exhibits lower fuel consumption and lower exhaust emission characteristics. Implementation of both the retarded braking torque idling feature and the consumer turn-off during high drive power demand features in a single drive system is particularly advantageous. The aforementioned bus control features are also advantageous in systems employing the consumer turn-off to increase drive torque feature.

As mentioned above, during times of increased demand for driving torque, the reduction of braking torque can occur by switching off or at least reducing the power uptake of one or more consumers. Alternatively, during a period of increased drive power demand the consumer(s) can be supplied from an energy accumulator, (for example, the starter battery of the vehicle) instead of the generator 1. In order to rule out unduly extensive discharge of the accumulator when several consumers are so supplied, the different consumers are advantageously partially or fully switched off as a function of the charging state of the energy accumulator in a sequence according to stipulated consumer priorities.

In all of the disclosed apparatus, any rotating machine that can be operated as a generator is suitable for use as the electrical machine. This can be an ordinary generator, which assumes no additional functions. However, the electrical machine advantageously also serves as a starter, so that, instead of including two electric machines (a generator and a starter), only one electric machine is present (starter/ generator). The electric machine can be connected indirectly, (e.g., via pinions, V-belts, etc.) to the internal combustion engine shaft. Advantageously, however, part of the machine, especially the rotor, sits directly on the engine shaft and is optionally connected to rotate in unison therewith. For example, the rotor can sit on the shaft leading to the transmission or on the other side of the internal combustion engine on the shaft stub that ends blindly there. Another machine part, especially the stator, is fixedly connected to a nonrotatable part or releasably connected part, (for example, to the engine or transmission housing). The electric machine can be implemented with particular advantage by a three-phase machine, (for example, an asynchronous or synchronous machine). Conversion of the alternating current produced by the generator (for example, a three-phase current) can occur, for example, by means of valves (for example, diodes) controlled by the voltage being switched. Better efficiency is obtained by means of a frequency converter, which generates the rotating fields with three-phase currents of fully adjustable frequency, phase and amplitude required for optimal generator effect by means of electronic switches controlled by separate control quantities (for example, field effect transistors or IGBTS).

Although certain embodiments of the teachings of the invention have been described herein, the scope of coverage of this patent is not limited thereto. On the contrary, this patent covers all instantiations of the teachings of the invention fairly falling within the scope of the appended claims either literally or under the doctrine of equivalents.

What is claimed is:

1. For use with a vehicle having a drive engine and at least two consumers of electrical power, an apparatus for retarding an increase in braking torque associated with connecting the at least two consumers to a source of electrical power, the apparatus comprising:

at least one generator operatively connected to the drive engine for developing a supply current, the at least one generator applying a braking torque to the drive engine, the braking torque being dependent upon the supply current; and a control system operatively coupled to the at least two consumers and responsive to a control signal requesting activation of the at least two consumers to connect the at least two consumers to the supply current developed by the at least one generator in succession to thereby ensure the braking torque applied to the drive engine by the at least one generator increases over a predefined time period rather than instantaneously when the at least two consumers are activated.

2. An apparatus as defined in claim 1 wherein the at least two consumers comprise at least two sub-consumers associated with a single consumer.

3. An apparatus as defined in claim 1 wherein the control system further comprises an engine controller, the engine controller being responsive to the control signal to increase a driving torque developed by the drive engine.

4. An apparatus as defined in claim 3 wherein the engine controller increases the driving torque developed by the drive engine by performing at least one of a filling intervention and an ignition intervention.

5. An apparatus as defined in claim 1 wherein the control system further comprises:

at least two controlled switches for selectively connecting respective ones of the at least two consumers to the supply current;

a torque controller for sequentially activating the at least two controlled switches; and a bus system operatively connecting the torque controller to the at least two controlled switches.

6. An apparatus as defined in claim 1 wherein the control system at least partially reduces the braking torque applied to the drive engine by the at least one generator during a power demand of the drive engine.

7. An apparatus as defined in claim 6 wherein the control system reduces the braking torque by at least partially reducing the current supplied by the at least one generator to at least one consumer.

8. An apparatus as defined in claim 7 wherein the control system at least partially reduces the current supplied to the at least one consumer as a function of a charge state of an alternative supply accumulator.

9. An apparatus as defined in claim 8 wherein the at least one consumer comprises the at least two consumers, and the control system at least partially reduces the current supplied to the at least two consumers in a sequence according to predefined consumer priorities.

10. An apparatus as defined in claim 7 wherein the control system further comprises an accumulator, and wherein, when the control system at least partially reduces the current supplied to the at least one consumer, the at least one consumer is temporarily supplied by the accumulator.

11. For use with a vehicle having a drive engine, a consumer of electrical power and an energy storage device, an apparatus for retarding an increase in braking torque associated with connecting the consumer to a source of electrical power, the apparatus comprising:

at least one generator operatively connected to the drive engine for developing a supply current, the at least one generator applying a braking torque to the drive engine, the braking torque being dependent upon the supply current; and a control system responsive to a control signal received at a first time and requesting activation of the consumer to connect the consumer to the supply current developed by the at least one generator after a delay period to thereby enable the at least one generator to increase both the supply current and the braking torque applied to the drive engine over the delay period rather than abruptly, the control system being adapted to supply at least a portion of the increased current supply developed in the delay period to the energy storage device.

12. An apparatus as defined in claim 11 wherein the braking torque is increased over the delay period to a level required for supplying the consumer with supply current.

13. An apparatus as defined in claim 11 wherein the length of the delay period is selected to permit an increase in a driving torque developed by the drive engine to a level sufficient to supply the consumer with supply current without reducing an idling speed of the drive engine below a predetermined threshold.

14. An apparatus as defined in claim 11 wherein the control system further comprises an engine controller, the engine controller being responsive to the control signal to increase a driving torque developed by the drive engine.

15. An apparatus as defined in claim 14 wherein the engine controller increases the driving torque developed by the drive engine by performing at least one of a filling intervention and an ignition intervention.

16. An apparatus as defined in claim 11 wherein the control system further comprises:

a first controlled switch for selectively connecting the consumer to the supply current;

a second controlled switch for selectively connecting the energy storage device to the supply current;

a torque controller for controlling the first and second controlled switches; and a bus system operatively connecting the torque controller to the first and second controlled switches.

17. An apparatus as defined in claim 16 wherein the energy storage device comprises a battery, and the second controlled switch comprises a battery charging controller connected in circuit with the battery, the battery charging controller being responsive to the torque controller to increase current supplied to the battery over the delay period from a first level to a second level to thereby increase the braking torque applied by the at least one generator, and the battery charging controller being adapted to drop the current supplied to the battery to the first level at the end of the delay period.

18. An apparatus as defined in claim 17 wherein the torque controller activates the first controlled switch to connect the consumer to the supplied current and controls the battery charging controller to abruptly drop the current supplied to the battery to the first level at substantially the same time.

19. An apparatus as defined in claim 11 wherein the control system at least partially reduces the braking torque applied to the drive engine by the at least one generator during a power demand of the drive engine.

20. An apparatus as defined in claim 19 wherein the control system reduces the braking torque by at least partially reducing the current supplied by the at least one generator to the consumer.

21. An apparatus as defined in claim 20 wherein the control system at least partially reduces the current supplied to the consumer as a function of a charge state of an alternative supply accumulator.

22. An apparatus as defined in claim 21 wherein the energy storage device comprises the alternative supply accumulator.

23. An apparatus as defined in claim 19 wherein the consumer comprises a first consumer and further comprising a second consumer, wherein the control system reduces the braking torque by at least partially reducing the current supplied to the first and second consumers in a sequence according to predefined consumer priorities.

24. An apparatus as defined in claim 20 wherein, when the control system at least partially reduces the current supplied to the first consumer, the first consumer is temporarily supplied by the energy storage device.

25. For use with a vehicle having a drive engine and first and second consumers of electrical power, an apparatus for retarding an increase in braking torque associated with connecting the first consumer to a source of electrical power, the apparatus comprising:

at least one generator operatively connected to the drive engine for developing a supply current, the at least one generator applying a braking torque to the drive engine, the braking torque being substantially in proportion to the supply current; and a control system operatively coupled to the first and second consumers, the control system being responsive to a control signal received at a first time and requesting activation of the first consumer to connect the first consumer to the supply current developed by the at least one generator after a delay period to thereby enable the at least one generator to increase both the supply current and the braking torque applied to the drive engine over the delay period rather than abruptly, the control system being adapted to supply at least a portion of the increased current supply developed in the delay period to the second consumer.

26. For use with a vehicle having a drive engine and at least two consumers of electrical power, a method for retarding an increase in braking torque associated with connecting the at least two consumers to a source of electrical power, the method comprising the steps of:

developing a supply current with at least one generator operatively coupled to the drive engine;

receiving a control signal requesting activation of the at least two consumers;

ensuring that a braking torque applied to the drive engine by the at least one generator increases over a predefined time period rather than instantaneously when the at least two consumers are activated by:
(a) connecting a first one of the at least two consumers to the supply current developed by the at least one generator at a first time; and
(b) connecting a second one of the at least two consumers to the supply current developed by the at least one generator at a second time occurring after the first time.

27. A method as defined in claim 26 wherein the at least two consumers comprise at least two sub-consumers associated with a single consumer.

28. A method as defined in claim 26 further comprising the step of responding to the control signal by increasing a driving torque developed by the drive engine.

29. A method as defined in claim 26 further comprising the step of at least partially reducing the braking torque applied to the drive engine by the at least one generator during a power demand of the drive engine.

30. A method as defined in claim 29 wherein the step of reducing the braking torque is performed by at least partially reducing the current supplied by the at least one generator to at least one consumer.

31. A method as defined in claim 30 wherein the step of at least partially reducing the current supplied by the at least one generator to at least one consumer is performed as a function of a charge state of an alternative supply accumulator.

32. For use with a vehicle having a drive engine, a consumer of electrical power, and an energy storage device, a method for retarding an increase in braking torque associated with connecting the consumer to a source of electrical power, the method comprising the steps of:

developing a supply current with at least one generator operatively coupled to the drive engine;

receiving a control signal at a first time requesting activation of the consumer;

controlling the at least one generator to increase both the supply current and the braking torque applied to the drive engine over a delay period rather than abruptly;

supplying at least a portion of the increased current supply developed in the delay period to the energy storage device; and connecting the consumer to the supply current developed by the at least one generator after the delay period.

33. A method as defined in claim 32 wherein the step of controlling the at least one generator to increase both the supply current and the braking torque applied to the drive engine over a delay period is performed by increasing the braking torque over the delay period to a level required for supplying the consumer with supply current.

34. A method as defined in claim 32 further comprising the step of increasing a driving torque developed by the drive engine over the delay period.

35. A method as defined in claim 32 wherein the step of connecting the consumer to the supply current comprises the steps of:

connecting the consumer to the supply current; and substantially simultaneously abruptly dropping the at least a portion of the increased current supply supplied to the energy storage device.

* * * * *